US012716748B2

(12) United States Patent
Ali et al.

(10) Patent No.: US 12,716,748 B2
(45) Date of Patent: Aug. 25, 2026

(54) GNSS ERROR QUANTIFICATION AND GLOBAL MAP ALIGNMENT

(71) Applicant: GM Global Technology Operations LLC, Detroit, MI (US)

(72) Inventors: Kamran Ali, Troy, MI (US); Bo Yu, Troy, MI (US); Shuqing Zeng, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 185 days.

(21) Appl. No.: 18/662,128

(22) Filed: May 13, 2024

(65) Prior Publication Data

US 2025/0347532 A1 Nov. 13, 2025

(51) Int. Cl.
*G01C 21/00* (2006.01)

(52) U.S. Cl.
CPC ..... *G01C 21/3848* (2020.08); *G01C 21/3841* (2020.08)

(58) Field of Classification Search
None
See application file for complete search history.

(56) References Cited

U.S. PATENT DOCUMENTS

| | | | | |
|---|---|---|---|---|
| 2018/0172453 A1* | 6/2018 | Weinfield | G01S 19/396 |
| 2020/0226413 A1* | 7/2020 | Ye | G06V 20/13 |
| 2021/0341308 A1* | 11/2021 | Ivanov | G01C 21/3837 |
| 2022/0227373 A1* | 7/2022 | Harouche | B60W 10/18 |

FOREIGN PATENT DOCUMENTS

| | | |
|---|---|---|
| CN | 108759833 * | 11/2018 |
| DE | 102019209398 A1 | 12/2020 |
| DE | 102019217658 A1 | 5/2021 |
| WO | 2020078572 A1 | 4/2020 |
| WO | 2020133415 A1 | 7/2020 |

OTHER PUBLICATIONS

Lu, F., et al. "Globally Consistent Range Scan Alignment for Environment Mapping," Autonomous Robots, vol. 4, Oct. 1997, pp. 333-349.

Umeyama, S. "Least-squares estimation of transformation parameters between two point patterns," IEEE Transactions on Pattern Analysis and Machine Intelligence, vol. 13, No. 4, Apr. 1991, pp. 376-380.

* cited by examiner

*Primary Examiner* — Hongye Liang
(74) *Attorney, Agent, or Firm* — Vivacqua Crane, PLLC

(57) ABSTRACT

A method for aligning a plurality of local maps with a global coordinate system includes quantifying a global navigation satellite system (GNSS) error at each of a plurality of locations within an environment. The method further includes determining a plurality of anchor points within the environment based at least in part on the GNSS error at each of the plurality of locations. The method further includes aligning the plurality of local maps with the global coordinate system based at least in part on the plurality of anchor points.

13 Claims, 3 Drawing Sheets

GNSS ERROR QUANTIFICATION AND GLOBAL MAP ALIGNMENT

The present disclosure relates to navigation, routing, and environmental mapping systems and methods for vehicles.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. ADS systems may use various sensors to detect objects in the environment around the vehicle and control the vehicle to navigate the vehicle through the environment to a predetermined destination. ADAS and ADS systems may also use vehicle location obtained using global navigation satellite systems (GNSS) in conjunction with globally aligned maps for navigation routing, path pathing, lane identification, obstacle avoidance, and/or the like. However, current GNSS systems and map alignment methods may not account for the presence of GNSS error introduced by regional environmental variations such as geographical features or tall structures.

Thus, while GNSS systems and map alignment methods achieve their intended purpose, there is a need for a new and improved system and method for aligning a plurality of local maps with a global coordinate system.

SUMMARY

According to several aspects, a method for aligning a plurality of local maps with a global coordinate system is provided. The method may include quantifying a global navigation satellite system (GNSS) error at each of a plurality of locations within an environment. The method further may include determining a plurality of anchor points within the environment based at least in part on the GNSS error at each of the plurality of locations. The method further may include aligning the plurality of local maps with the global coordinate system based at least in part on the plurality of anchor points.

In another aspect of the present disclosure, quantifying the GNSS error at each of the plurality of locations further may include collecting the plurality of local maps from a plurality of vehicles. Quantifying the GNSS error at each of the plurality of locations further may include identifying the plurality of locations in the plurality of local maps. Quantifying the GNSS error at each of the plurality of locations further may include quantifying the GNSS error at each of the plurality of locations based at least in part on the plurality of local maps.

In another aspect of the present disclosure, collecting the plurality of local maps further may include collecting the plurality of local maps from the plurality of vehicles using simultaneous localization and mapping (SLAM). Each of the plurality of local maps includes a plurality of observation points. Each of the plurality of observation points includes observation data, local map coordinates, and GNSS coordinates.

In another aspect of the present disclosure, identifying the plurality of locations in the plurality of local maps further may include identifying a plurality of proximal observation point pairs based on the plurality of observation points of each of the plurality of local maps. Each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps. Identifying the plurality of locations in the plurality of local maps further may include identifying the plurality of locations. Each of the plurality of locations includes the first observation point of one of the plurality of proximal observation point pairs.

In another aspect of the present disclosure, quantifying the GNSS error at each of the plurality of locations based at least in part on the plurality of local maps further may include executing a re-localization algorithm to determine a transformation vector between the first observation point and the second observation point. The transformation vector describes a difference in location in the environment between the first observation point and the second observation point. Quantifying the GNSS error at each of the plurality of locations based at least in part on the plurality of local maps further may include determining the GNSS error between the first observation point and the second observation point. The GNSS error is:

$$e_{GNSS} = \|GNSS_1 - GNSS_2\| - \|T\|$$

where $e_{GNSS}$ is the GNSS error between the first observation point and the second observation point, $GNSS_1$ is the GNSS coordinates of the first observation point, $GNSS_2$ is the GNSS coordinates of the second observation point, and T is the transformation vector. Quantifying the GNSS error at each of the plurality of locations based at least in part on the plurality of local maps further may include updating the GNSS coordinates of the first observation point based at least in part on the transformation vector.

In another aspect of the present disclosure, updating the GNSS coordinates of the first observation point further may include transforming GNSS coordinates of the second observation point by the transformation vector to determine transformed GNSS coordinates of the second observation point. Updating the GNSS coordinates of the first observation point further may include averaging the GNSS coordinates of the first observation point with the transformed GNSS coordinates of the second observation point to determine updated GNSS coordinates of the first observation point.

In another aspect of the present disclosure, determining the plurality of anchor points further may include determining a plurality of anchor locations. The plurality of anchor locations includes a subset of the plurality of locations. Determining the plurality of anchor points further may include determining a plurality of anchor points. Each of the plurality of anchor points corresponds to one of the plurality of anchor locations.

In another aspect of the present disclosure, determining the plurality of anchor locations further may include determining the plurality of anchor locations, where each of the plurality of anchor locations has a GNSS error less than or equal to a predetermined error threshold.

In another aspect of the present disclosure, determining the plurality of anchor locations further may include determining the plurality of anchor locations, where each of the plurality of anchor locations has a GNSS error less than or equal to a predetermined error threshold, and where each of the plurality of anchor locations has at least a first predetermined quantity of the plurality of observation points within a second predetermined radius of the each of the plurality of anchor locations.

In another aspect of the present disclosure, aligning the plurality of local maps with the global coordinate system further may include performing a first stage alignment using a first alignment algorithm and a first subset of the plurality of anchor points.

In another aspect of the present disclosure, aligning the plurality of local maps with the global coordinate system further may include performing a second stage alignment using a second alignment algorithm and a second subset of the plurality of anchor points. The second alignment algorithm is different from the first alignment algorithm. The second subset of the plurality of anchor points is smaller than the first subset of the plurality of anchor points.

According to several aspects, a system for aligning a plurality of local maps with a global coordinate system is provided. The system may include a plurality of vehicle sensors including at least a vehicle global navigation satellite system (GNSS), a vehicle perception sensor, and a vehicle communication system. The system further may include a vehicle controller in electrical communication with the plurality of vehicle sensors. The vehicle controller is programmed to collect the plurality of local maps of an environment using simultaneous localization and mapping (SLAM). Each of the plurality of local maps includes a plurality of observation points. Each of the plurality of observation points includes observation data including observations made using the vehicle perception sensor, local map coordinates, and GNSS coordinates determined using the vehicle GNSS. The vehicle controller is further programmed to transmit the plurality of local maps to a server system using the vehicle communication system.

In another aspect of the present disclosure, the system further includes the server system. The server system may include a server communication system and a server controller in electrical communication with the server communication system. The server controller is programmed to receive the plurality of local maps using the server communication system. The server controller is further programmed to identify a plurality of locations in the plurality of local maps. The server controller is further programmed to quantify a GNSS error at each of the plurality of locations based at least in part on the plurality of local maps. The server controller is further programmed to determine a plurality of anchor points based at least in part on the GNSS error at each of the plurality of locations. The server controller is further programmed to align the plurality of local maps with the global coordinate system based at least in part on the plurality of anchor points.

In another aspect of the present disclosure, to identify the plurality of locations in the plurality of local maps, the server controller is further programmed to identify a plurality of proximal observation point pairs based on the plurality of observation points of each of the plurality of local maps. Each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps. To identify the plurality of locations in the plurality of local maps, the server controller is further programmed to identify the plurality of locations. Each of the plurality of locations includes the first observation point of one of the plurality of proximal observation point pairs.

In another aspect of the present disclosure, to quantify the GNSS error at each of the plurality of locations, the server controller is further programmed to execute a re-localization algorithm to determine a transformation vector between the first observation point and the second observation point. The transformation vector describes a difference in location in the environment between the first observation point and the second observation point. To quantify the GNSS error at each of the plurality of locations, the server controller is further programmed to determine the GNSS error between the first observation point and the second observation point. The GNSS error is:

$$e_{GNSS} = \|GNSS_1 - GNSS_2\| - \|T\|$$

where $e_{GNSS}$ is the GNSS error between the first observation point and the second observation point, $GNSS_1$ is the GNSS coordinates of the first observation point, $GNSS_2$ is the GNSS coordinates of the second observation point, and T is the transformation vector.

In another aspect of the present disclosure, to determine the plurality of anchor points, the server controller is further programmed to determine a plurality of anchor locations. The plurality of anchor locations includes a subset of the plurality of locations. Each of the plurality of anchor locations has a GNSS error less than or equal to a predetermined error threshold. Each of the plurality of anchor locations has at least a first predetermined quantity of the plurality of observation points within a second predetermined radius of the each of the plurality of anchor locations. To determine the plurality of anchor points, the server controller is further programmed to determine the plurality of anchor points, where each of the plurality of anchor points corresponds to one of the plurality of anchor locations, and where GNSS coordinates of each of the plurality of anchor points are a median of the GNSS coordinates of the first observation point and the GNSS coordinates of the second observation point included in each of the plurality of anchor locations.

In another aspect of the present disclosure, to align the plurality of local maps with the global coordinate system, the server controller is further programmed to perform a first stage alignment using a first alignment algorithm and a first subset of the plurality of anchor points.

In another aspect of the present disclosure, to align the plurality of local maps with the global coordinate system, the server controller is further programmed to perform a second stage alignment using a second alignment algorithm and a second subset of the plurality of anchor points. The second alignment algorithm is different from the first alignment algorithm. The second subset of the plurality of anchor points is smaller than the first subset of the plurality of anchor points.

According to several aspects, a method for aligning a plurality of local maps with a global coordinate system is provided. The method may include collecting the plurality of local maps of an environment from a plurality of vehicles using simultaneous localization and mapping (SLAM). Each of the plurality of local maps includes a plurality of observation points. Each of the plurality of observation points includes observation data, local map coordinates, and GNSS coordinates. The method further may include identifying a plurality of proximal observation point pairs based on the plurality of observation points of each of the plurality of local maps. Each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps. The method further may include identifying a plurality of locations. Each of the plurality of locations includes the first observation point of one of the plurality of proximal observation point pairs. The method further may include executing a re-localization algorithm to determine a transformation vector between the first observation point and the second observation point. The transformation vector describes a difference in location in the environment between the first observation point and the second observation point. The method further may include determining a GNSS error at each of the plurality of locations. The GNSS error at one of the plurality of locations is:

$$e_{GNSS} = \|GNSS_1 - GNSS_2\| - \|T\|$$

where $e_{GNSS}$ is the GNSS error between the first observation point and the second observation point at one of the plurality of locations, $GNSS_1$ is the GNSS coordinates of the first observation point, $GNSS_2$ is the GNSS coordinates of the second observation point, and T is the transformation vector.

In another aspect of the present disclosure, the method further may include determining a plurality of anchor locations. The plurality of anchor locations includes a subset of the plurality of locations. Each of the plurality of anchor locations has a GNSS error less than or equal to a predetermined error threshold. The method further may include determining a plurality of anchor points. Each of the plurality of anchor points corresponds to one of the plurality of anchor locations. GNSS coordinates of each of the plurality of anchor points are a median of the GNSS coordinates of the first observation point and the GNSS coordinates of the second observation point included in each of the plurality of anchor locations.

In another aspect of the present disclosure, the method further may include performing a first stage alignment using a first alignment algorithm and a first subset of the plurality of anchor points. The method further may include performing a second stage alignment using a second alignment algorithm and a second subset of the plurality of anchor points. The second alignment algorithm is different from the first alignment algorithm. The second subset of the plurality of anchor points is smaller than the first subset of the plurality of anchor points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, accuracy of position information determined using global navigation satellite systems (GNSS) is increasingly important to automotive and vehicle use cases, including, for example, navigation routing, advanced driver assistance systems (ADAS), and automated driving systems (ADS). However, GNSS data may contain significant amounts of noise or steady-state error caused by regional environmental factors such as obstruction by tall buildings (also known as "urban canyons"). Therefore, in aspects of the present disclosure, it is advantageous to quantify GNSS error in a particular location for use in construction and alignment of globally aligned maps for vehicle applications. Accordingly, the present disclosure provides a new and improved system and method for aligning a plurality of local maps with a global coordinate system including accurate quantification of GNSS error at particular locations, even in absence of known reference points or ground-truth information.

Figure 1:
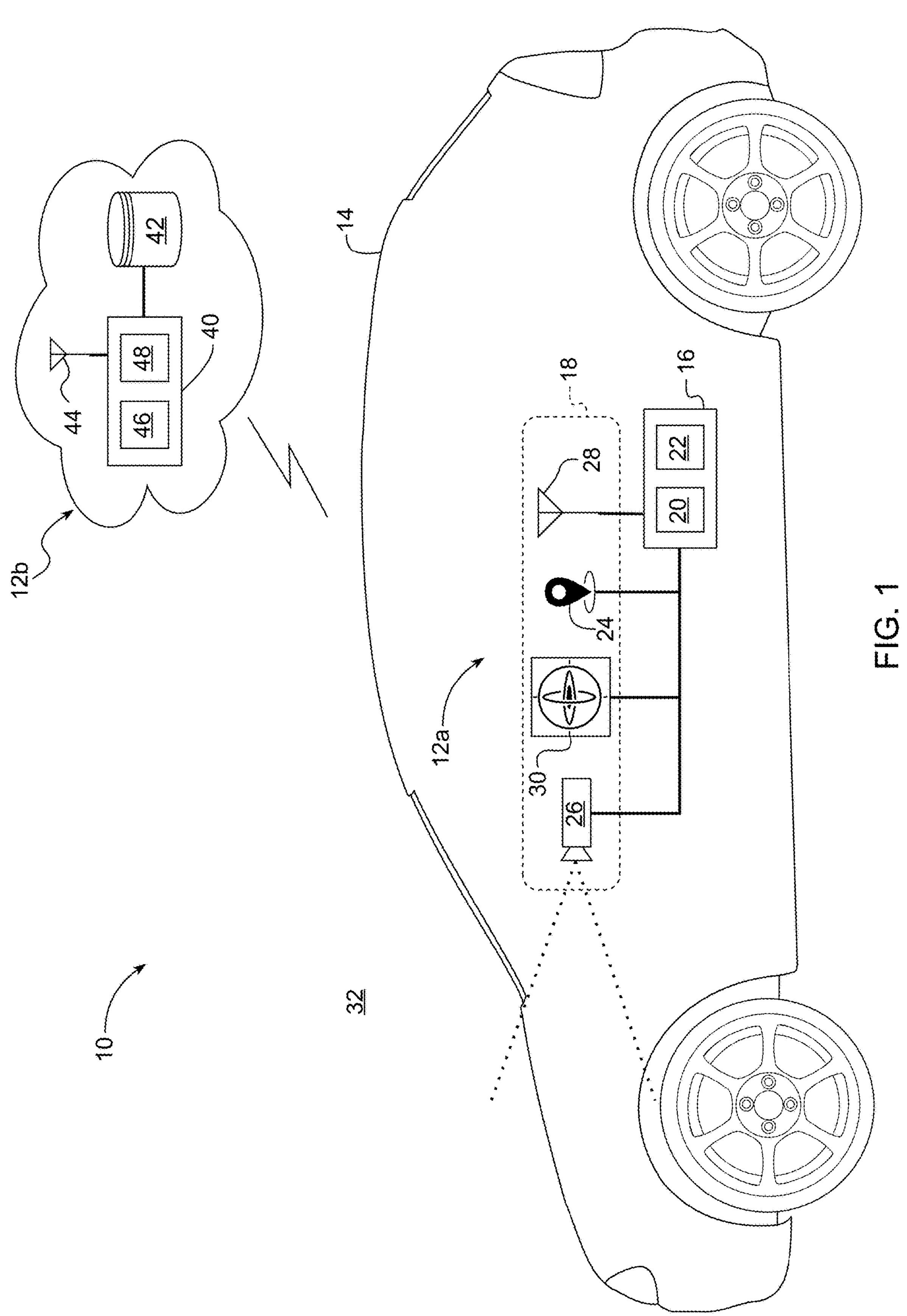
FIG. 1 is a schematic diagram of a system for aligning a plurality of local maps with a global coordinate system, according to an exemplary embodiment.

Referring to FIG. 1, a system for aligning a plurality of local maps with a global coordinate system is illustrated and generally indicated by reference number 10. The system 10 generally includes a vehicle system 12*a* and a server system 12*b*. The vehicle system 12*a* is shown with an exemplary vehicle 14. While a passenger vehicle is illustrated, it should be appreciated that the vehicle 14 may be any type of vehicle without departing from the scope of the present disclosure. The vehicle system 12*a* generally includes a vehicle controller 16 and a plurality of vehicle sensors 18.

The vehicle controller 16 The vehicle controller 16 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the vehicle controller 16, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 16 to control various systems of the vehicle 12.

The vehicle controller 16 may also consist of multiple controllers which are in electrical communication with each other. The vehicle controller 16 may be inter-connected with additional systems and/or controllers of the vehicle 12, allowing the vehicle controller 16 to access data such as, for example, speed, acceleration, braking, and steering angle of the vehicle 12.

The vehicle controller 16 is in electrical communication with plurality of vehicle sensors 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 16 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 18 are used to acquire information relevant to the vehicle 14. In an exemplary embodiment, the plurality of vehicle sensors 18 includes a vehicle global navigation satellite system (GNSS) 24, a vehicle perception sensor 26, a vehicle communication system 28, and a vehicle inertial measurement unit (IMU) 30.

The vehicle GNSS 24 is used to determine a geographical location of the vehicle 14. In an exemplary embodiment, the vehicle GNSS 24 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 14 based on the signals received by the GPS receiver antenna. In an exemplary embodiment, the vehicle GNSS 24 additionally includes a map. The map includes information about infrastructure such as municipality borders, roadways, railways, sidewalks, buildings, and the like. Therefore, the geographical location of the vehicle 14 is contextualized using the map information. In a non-limiting example, the map is retrieved from a remote source using a wireless connection. In another non-limiting example, the map is stored in a database of the vehicle GNSS 24. It should be understood that various additional types of satellite-based radionavigation systems, such as, for example, the Global Positioning System (GPS), Galileo, GLONASS, and the BeiDou Navigation Satellite System (BDS) are within the scope of the present disclosure. The vehicle GNSS 24 is in electrical communication with the vehicle controller 16 as discussed above.

The vehicle perception sensor 26 is used to perceive objects and/or measure distances in an environment 32 surrounding the vehicle 14. In an exemplary embodiment, the vehicle perception sensor 26 includes a surround view camera system including a plurality of cameras (also known as satellite cameras) arranged to provide a view of the environment 32 adjacent to all sides of the vehicle 14. In a non-limiting example, the camera system includes a front-facing camera (mounted, for example, in a front grille of the vehicle 14), a rear-facing camera (mounted, for example, on a rear tailgate of the vehicle 14), and two side-facing cameras (mounted, for example, under each of two side-view mirrors of the vehicle 14). In another non-limiting example, the camera system further includes an additional rear-view camera mounted near a center high mounted stop lamp of the vehicle 14. It should be understood that camera systems having additional cameras and/or additional mounting locations are within the scope of the present disclosure.

In another exemplary embodiment, the vehicle perception sensor 26 includes a stereoscopic camera having distance measurement capabilities. In one example, the vehicle perception sensor 26 is affixed inside of the vehicle 14, for example, in a headliner of the vehicle 14, having a view through a windscreen of the vehicle 14. In another example, the vehicle perception sensor 26 is affixed outside of the vehicle 14, for example, on a roof of the vehicle 14, having a view of the environment 32 surrounding the vehicle 14.

It should be understood that various additional types of perception sensors, such as, for example, LiDAR sensors, ultrasonic ranging sensors, radar sensors, and/or time-of-flight sensors are within the scope of the present disclosure. The vehicle perception sensor 26 is in electrical communication with the vehicle controller 16 as discussed above.

The vehicle communication system 28 is used by the vehicle controller 16 to communicate with other systems external to the vehicle 14. For example, the vehicle communication system 28 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 14 and any remote system (e.g., vehicles, infrastructure, and/or remote systems).

In certain embodiments, the vehicle communication system 28 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 28 may further include an embedded universal integrated circuit card (eUICC) configured to store at least one cellular connectivity configuration profile, for example, an embedded subscriber identity module (eSIM) profile.

The vehicle communication system 28 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system 28 may include one or more antennas and/or communication transceivers for receiving and/or transmitting signals, such as cooperative sensing messages (CSMs). The vehicle communication system 28 is configured to wirelessly communicate information between the vehicle 14 and another vehicle. Further, the vehicle communication system 28 is configured to wirelessly communicate information between the vehicle 14 and infrastructure or other vehicles. It should be understood that the vehicle communication system 28 may be integrated with the vehicle controller 16 (e.g., on a same circuit board with the vehicle controller 16 or otherwise a part of the vehicle controller 16) without departing from the scope of the present disclosure. The vehicle communication system 28 is in electrical communication with the vehicle controller 16 as discussed above.

The vehicle IMU 30 is used to determine an orientation, velocity, and gravitational forces acting upon the vehicle 14. In an exemplary embodiment, the vehicle IMU 30 includes several sensors, including accelerometers, gyroscopes, and/or magnetometers. In a non-limiting example, the vehicle IMU 30 includes three-axis accelerometers and three-axis gyroscopes, which are integrated into a single unit. The accelerometers measure linear acceleration along each axis, while the gyroscopes measure angular velocity about each axis. The vehicle IMU 30 processes data from the sensors to calculate the current orientation, speed, heading, yaw rate (i.e., rate of change of heading), and acceleration of the vehicle 14 in three-dimensional space. The vehicle IMU 30 is in electrical communication with the vehicle controller 16, as discussed above.

It should be understood that the plurality of vehicle sensors 18 may include additional sensors without departing from the scope of the present disclosure. In an exemplary embodiment, the plurality of vehicle sensors 18 further includes sensors to determine performance data about the vehicle 14. In a non-limiting example, the plurality of vehicle sensors 18 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 18 further includes sensors to determine information about an environment within the vehicle 14. In a non-limiting example, the plurality of vehicle sensors 18 further includes at least one of a seat occupancy sensor, a cabin air temperature sensor, a cabin motion detection sensor, a cabin camera, a cabin microphone, and/or the like.

In another exemplary embodiment, the plurality of vehicle sensors 18 further includes sensors to determine information about the environment 32 surrounding the vehicle 14. In a non-limiting example, the plurality of vehicle sensors 18 further includes at least one of an ambient air temperature sensor, a barometric pressure sensor, and/or a photo and/or video camera which is positioned to view the environment 32 in front of the vehicle 14. The plurality of vehicle sensors 18 are in electrical communication with the vehicle controller 16 as discussed above.

With continued reference to FIG. 1, the server system **12*b* is illustrated and generally indicated by reference number 12*b*. The server system 12*b* generally includes a server controller 40 in electrical communication with a server database 42 and a server communication system 44. In a non-limiting example, the server system 12*b*** is located in a server farm, datacenter, or the like, and connected to the internet.

The server controller 40 is used to implement the method 100 for aligning a plurality of local maps with a global coordinate system, as will be described below. The server controller 40 includes at least one server processor 46 and a server non-transitory computer readable storage device or server media 48. The description of the type and configuration given above for the vehicle controller 16 also applies to the server controller 40. In some examples, the server controller 40 may differ from the vehicle controller 16 in that the server controller 40 is capable of a higher processing speed, includes more memory, includes more inputs/outputs, and/or the like. In a non-limiting example, the server processor 46 and server media 48 of the server controller 40 are similar in structure and/or function to the processor 20 and the media 22 of the vehicle controller 16, as described above.

The server database 42 is used to store data received from the vehicle 14, including, for example, maps, information about lane boundaries, road geometry, speed limits, traffic signs, and/or other relevant features. While a single vehicle 14 is shown in FIG. 1, it should be understood that the server system **12*b* may communicate with a plurality of vehicles (not shown) to crowdsource data, as will be discussed in greater detail below. In an exemplary embodiment, the server database 42 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 40 may execute software such as, for example, a database management system (DBMS), allowing data stored on the one or more mass storage devices to be organized and accessed. The server database 42 is in electrical communication with the server controller 40**.

The server communication system 44 is used to communicate with external systems, such as, for example, the vehicle controller 16 via the vehicle communication system 28. In a non-limiting example, server communication system 44 is similar in structure and/or function to the vehicle communication system 28, as described above. In some examples, the server communication system 44 may differ from the vehicle communication system 28 in that the server communication system 44 is capable of higher power signal transmission, more sensitive signal reception, higher bandwidth transmission, additional transmission/reception protocols, and/or the like. The server communication system 44 is in electrical communication with the server controller 40.

Figure 2:
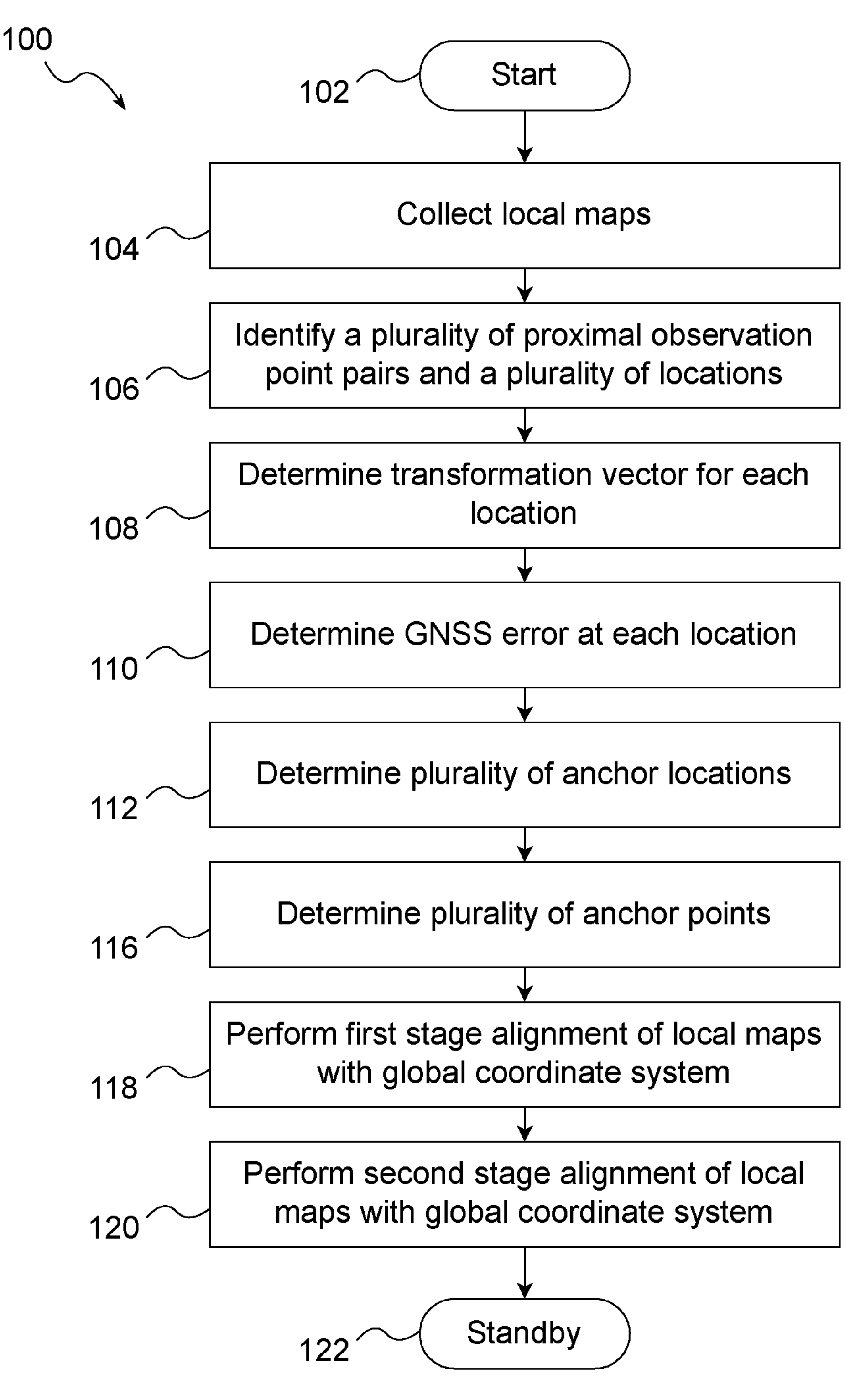
FIG. 2 is a flowchart of a method for aligning the plurality of local maps with the global coordinate system, according to an exemplary embodiment.

Referring to FIG. 2, a flowchart of the method 100 for aligning a plurality of local maps with a global coordinate system is shown. The method 100 begins at block 102 and proceeds to block 104. At block 104, the server system **12*b* collects a plurality of local maps 50 (FIG. 3) from a plurality of vehicles (not shown) in the environment 32, including, for example, the vehicle 14**.

Figure 3:
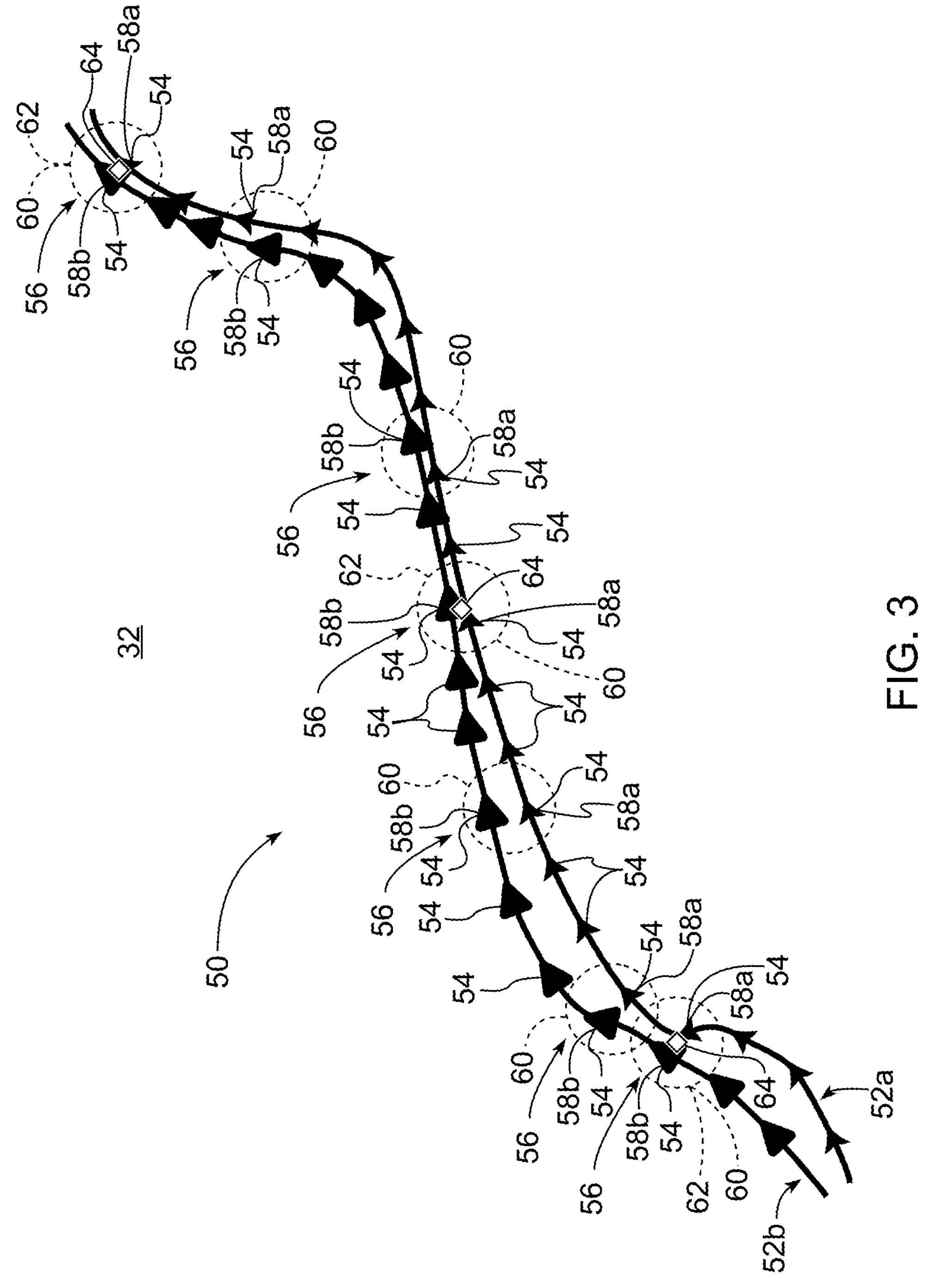
FIG. 3 is a schematic diagram of the plurality of local maps in an environment, according to an exemplary embodiment.

Referring to FIG. 3, a schematic diagram of the plurality of local maps 50 is shown. The plurality of local maps 50 includes a first local map **52*a* and a second local map 52*b*. In an exemplary embodiment, the first local map 52*a* and the second local map 52*b* are collected by the plurality of vehicle sensors 18 of the vehicle 14 during two separate drives through the same region of the environment 32. In another exemplary embodiment, the first local map 52*a* is collected by the plurality of vehicle sensors 18 of the vehicle 14 and the second local map 52*b* is collected by a plurality of vehicle sensors of another vehicle (not shown) of the plurality of vehicles (not shown) driving through the same region of the environment 32. In the following disclosure, collection of the plurality of local maps 50 will be discussed from the perspective of the vehicle 14 using the vehicle system 12*a* for the sake of explanation. It should be understood that, in some embodiments, one or more of the plurality of local maps 50 is collected by one or more of the plurality of vehicles (not shown) in the environment 32, and that the plurality of vehicles (not shown) are equipped with systems having similar or equivalent structure and/or function to the vehicle system 12***a*.

In an exemplary embodiment, each of the plurality of local maps 50 includes a plurality of observation points 54. Each of the plurality of observation points 54 represents an observation of the environment 32 from a perspective of a specific location within the environment 32. Each of the plurality of observation points 54 includes observation data collected by the plurality of vehicle sensors, local map coordinates orienting the observation point 54 within one of the plurality of local maps 50, and GNSS coordinates measured using the vehicle GNSS 24 at the location of the observation point 54.

The local map coordinates of each of the plurality of observation points 54 are determined using a simultaneous localization and mapping (SLAM) algorithm. In the following disclosure, the SLAM algorithm will be discussed from the perspective of the vehicle system 12*a* as used to generate one of the plurality of local maps 50. However, it should be understood that the following disclosure is applicable to any of the plurality of vehicles (not shown). The SLAM algorithm is used by the vehicle controller 16 to simultaneously determine a location of the vehicle 14 within the environment 32 while also constructing a local map of the environment 32. In an exemplary embodiment, the SLAM algorithm employs observation data collected by the plurality of vehicle sensors 18, such as the vehicle perception sensor 26 and/or the vehicle IMU 30, to achieve this functionality. In a non-limiting example, the SLAM algorithm includes four software components: a localization module, a mapping module, a place recognition module, and a re-localization module.

The localization module utilizes the observation data to estimate a pose (position and orientation) of the vehicle 14 relative to objects (e.g., lane lines, road edges, landmarks, structures, trees, and/or the like) in the environment 32. The localization module employs techniques such as Bayesian filtering or Kalman filtering to fuse the observation data and predict a current state of the vehicle 14 accurately. Simultaneously, the mapping module constructs a local map of the environment 32 based on the observation data and odometry data collected during motion (e.g., visual data from the perception sensor 26 and inertial/odometry data from the vehicle IMU 30). The mapping module incrementally builds and updates the local map by capturing the plurality of observation points 54 and calculating the local map coordinates of each of the plurality of observation points 54 relative to a local map coordinate system.

The place recognition module is responsible for identifying nearby locations within the environment 32 based on observation data. The place recognition module executes a place recognition algorithm to compare two sets of observation data (e.g., current observation data observed by the vehicle 14 and observation data stored in the local map) to recognize familiar places or landmarks. In a non-limiting example, the place recognition algorithm identifies similarities in the two sets of observation data and quantifies a degree of similarity between the two sets of observation data. If the degree of similarity is greater than a predetermined threshold, the two sets of observation data are determined to be nearby in location (e.g., within a first predetermined radius of each other, for example, ten meters). After identifying nearby locations, the re-localization module is used.

The re-localization module is used to determine a transformation vector between two nearby locations as identified by the place recognition module (e.g., a current location of the vehicle 14 and a previously visited location as identified by the place recognition module). In a non-limiting example, when the vehicle 14 is near a previously visited location as identified by the place recognition module, the re-localization module uses a re-localization algorithm to calculate a transformation vector which describes a difference in location in the environment 32 between the current location of the vehicle 14 and the nearby previously visited location. In general, the re-localization algorithm is configured to receive any two nearby sets of observation data (e.g., from two of the plurality of observation points 54 identified to be nearby by the place recognition module) and calculate the transformation vector from one of the two sets of observation data to the other.

Referring again to FIG. 2 with continued reference to FIG. 3, at block 104, the plurality of vehicles (not shown) collect the plurality of local maps 50 using the SLAM algorithm as discussed above and transmit the plurality of local maps 50 to the server communication system 44. In a non-limiting example, the vehicle system 12*a* of the vehicle 14 executes the SLAM algorithm to collect at least one of the plurality of local maps 50 using observation and odometry data from the plurality of vehicle sensors 18 and transmits the at least one of the plurality of local maps 50 to the server system 12*b* using the vehicle communication system 28. In an exemplary embodiment, the plurality of local maps 50 are stored in the server database 42 of the server system 12*b*. After block 104, the method 100 proceeds to block 106.

At block 106, referring again to FIG. 3 with continued reference to FIG. 2, the server controller 40 identifies a plurality of proximal observation point pairs 56. In the scope of the present disclosure, the plurality of proximal observation point pairs 56 includes pairs of the plurality of observation points 54 of the plurality of local maps 50 which are located within a predetermined radius of one another. Each of the plurality of proximal observation point pairs 56 includes a first observation point 58*a* from a first local map (e.g., the first local map 52*a*) and a second observation point 58*b* from a second local map (e.g., the second local map 52*b*). The local map coordinates of each of the plurality of observation points 54 orient each of the plurality of observation points 54 within one of the plurality of local maps 50, but do not provide position information on a global coordinate system. The GNSS coordinates of each of the plurality of observation points 54 provide position information on a global coordinate system, but may be influenced by GNSS error. Therefore, the server controller 40 executes the SLAM place recognition algorithm, as discussed above, to identify the plurality of proximal observation point pairs 56 based on the observation data of each of the plurality of observation points 54 of each of the plurality of local maps 50.

After identifying each of the plurality of proximal observation point pairs 56, the server controller 40 identifies a plurality of locations 60. Each of the plurality of locations 60 is the first observation point 58*a* of one of the plurality of proximal observation point pairs 56. Referring again to FIG. 2, after block 106, the method 100 proceeds to block 108.

At block 108, the server controller 40 determines a transformation vector for each of the plurality of locations 60. In the scope of the present disclosure, the transformation vector of one of the plurality of locations 60 describes a difference in location in the environment 32 between the first observation point 58*a* and the second observation point 58*b* of the one of the plurality of locations 60. The local map coordinates of each of the plurality of observation points 54 orient each of the plurality of observation points 54 within one of the plurality of local maps 50, but do not provide position information on a global coordinate system. The GNSS coordinates of each of the plurality of observation points 54 provide position information on a global coordinate system, but may be influenced by GNSS error. Therefore, the server controller 40 executes the SLAM re-localization algorithm, as discussed above, to determine the transformation vector for each of the plurality of locations 60 based on the observation data of each of the plurality of observation points 54. After block 108, the method 100 proceeds to block 110.

At block 110, the server controller 40 determines a GNSS error at each of the plurality of locations 60. In the scope of the present disclosure, the GNSS error includes both noise and steady-state error in GNSS measurements, including, for example, estimated horizontal position error (EHPE). The GNSS error may be caused by various factors. For example, tall structures or environmental features may block signals from GNSS satellites, causing increased GNSS error. In general, the GNSS error varies across the environment 32 due to differences in geography, urbanization, and additional environmental factors. To determine the GNSS error at each of the plurality of locations 60, the server controller 40 uses a formula:

$$e_{GNSS} = \|GNSS_1 - GNSS_2\| - \|T\| \quad (1)$$

where $e_{GNSS}$ is the GNSS error between the first observation point 58*a* and the second observation point 58*b* of one of the plurality of locations 60, $GNSS_1$ is the GNSS coordinates of the first observation point 58*a* of the one of the plurality of locations 60, $GNSS_2$ is the GNSS coordinates of the second observation point 58*b* of the one of the plurality of locations 60, and T is the transformation vector of the one of the plurality of locations 60 determined at block 108. In an exemplary embodiment, upon subsequent executions of the method 100 with additional observation points, the GNSS error may be updated by average, exponential average, moving average, median, and/or the like of the previously determined GNSS error and the new GNSS error determined based on additional observation points.

In an exemplary embodiment, the server controller 40 additionally updates the GNSS coordinates of the first observation point 58*a* based at least in part on the transformation vector. The server controller 40 first determines transformed GNSS coordinates of the second observation point 58*b*. In a non-limiting example, the transformed GNSS coordinates of the second observation point 58*b* are determined by transforming the GNSS coordinates of the second observation point 58*b* by the transformation vector. The server controller 40 subsequently updates the GNSS coordinates of the first observation point 58*a*. In a non-limiting example, the GNSS coordinates of the first observation point 58*a* are averaged with the transformed GNSS coordinates of the second observation point 58*b* to determine updated GNSS coordinates of the first observation point 58*a*. In another non-limiting example, the transformed GNSS coordinates of the second observation point 58*b* are saved over multiple executions of the method 100 and a median of a plurality of transformed GNSS coordinates of the second observation point 58*b* is later calculated to determine the updated GNSS coordinates of the first observation point 58*a*. After block 110, the method 100 proceeds to block 112.

Referring again to FIG. 3 with continued reference to FIG. 2, at block 112, the server controller 40 determines a plurality of anchor locations 62. In the scope of the present disclosure, the plurality of anchor locations 62 includes a subset of the plurality of locations 60 determined at block 106. The plurality of anchor locations 62 will be used for alignment of the plurality of local maps 50 to with a global coordinate system, as will be discussed in greater detail below.

In an exemplary embodiment, the plurality of anchor locations 62 includes a subset of the plurality of locations 60 having a GNSS error, as determined at block 110, less than or equal to a predetermined error threshold (e.g., a magnitude of the GNSS error is less than or equal to two meters). In another exemplary embodiment, the plurality of anchor locations 62 includes a subset of the plurality of locations 60 having a GNSS error, as determined at block 110, less than or equal to the predetermined error threshold and having at least a first predetermined quantity (e.g., twenty) of the plurality of observation points 54 located within a second predetermined radius (e.g., five meters) of each of the subset of the plurality of locations 60. In another exemplary embodiment, each of the plurality of anchor locations 62 is chosen to be at least a predetermined distance (e.g., one hundred meters) from any other anchor location 62, such as to enforce spatial diversity of the plurality of anchor locations 62 within the environment 32. In another exemplary embodiment, locations 60 having a high re-localization error covariance, as determined during re-localization at block 108, are not chosen as one of the plurality of anchor locations 62. After block 112, the method 100 proceeds to block 116.

With continued reference to FIGS. 2-3, at block 116, the server controller 40 determines a plurality of anchor points 64. Each of the plurality of anchor points 64 corresponds to one of the plurality of anchor locations 62 determined at block 112. In the scope of the present disclosure, each of the plurality of anchor points 64 is a location in the environment 32 defined by GNSS coordinates. In an exemplary embodiment, the GNSS coordinates of each of the plurality of anchor points 64 are chosen to be a median or a mean of the GNSS coordinates of the first observation point 58*a* and the second observation point 58*b* in each of the plurality of anchor locations 62. After block 116, the method 100 proceeds to block 118.

Referring again to FIG. 2, at block 118, a first stage alignment of each of the plurality of local maps 50 with a global coordinate system is performed. In the scope of the present disclosure, the global coordinate system is a substantially globally agreed-upon system for identifying locations on the Earth using two- or three-dimensional coordinate points, for example, according to ISO 6709. In an exemplary embodiment, the first stage alignment is performed by the server controller 40. In another exemplary embodiment, the first stage alignment is performed by the vehicle controller 16. The following disclosure, though explained from the perspective of the server controller 40, is also applicable to embodiments where the first stage alignment is performed by the vehicle controller 16.

In general, the goal of the first stage alignment is to apply transformations (e.g., translation, rotation, scaling, and/or the like) to the plurality of local maps 50 in order to fit the plurality of local maps 50 onto the global coordinate system based on the plurality of anchor points 64. In an exemplary embodiment, the first stage alignment is performed using a first subset of the plurality of anchor points 64. The first subset of the plurality of anchor points 64 is relatively large. In a non-limiting example, the first subset of the plurality of anchor points 64 includes the entirety of the plurality of anchor points 64. In another non-limiting example, the first subset of the plurality of anchor points 64 includes anchor points 64 having greater than a second predetermined quantity (e.g., three) of the plurality of observation points 54 located within a third predetermined radius (e.g., five meters) of each of the first subset of the plurality of anchor points 64.

To perform the first stage alignment, the first subset of the plurality of anchor points 64 and the plurality of local maps 50 are provided as inputs to a first alignment algorithm. In general, the first alignment algorithm is a point-cloud registration algorithm configured to determine transformations necessary to align each of the plurality of local maps 50 with the first subset of the plurality of anchor points 64. In an exemplary embodiment, the first alignment algorithm is a first machine learning alignment algorithm.

In a non-limiting example, the first machine learning alignment algorithm includes multiple layers, including an input layer and an output layer, as well as one or more hidden layers. The input layer receives the first subset of the plurality of anchor points 64 and the plurality of local maps 50 as inputs. The inputs are then passed on to the hidden layers. Each hidden layer applies a transformation (e.g., a non-linear transformation) to the data and passes the result to the next hidden layer until the final hidden layer. The output layer produces the transformations necessary to align each of the plurality of local maps 50 with the first subset of the plurality of anchor points 64.

To train the first machine learning alignment algorithm, a dataset of inputs and their corresponding optimal outputs is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the first machine learning alignment algorithm, the algorithm is capable of accurately and precisely determining the transformations necessary to align each of the plurality of local maps 50 with the first subset of the plurality of anchor points 64 based on the first subset of the plurality of anchor points 64 and the plurality of local maps 50. By adjusting the weights between the nodes in each hidden layer during training, the algorithm "learns" to recognize patterns in the data that are indicative of the transformations necessary to align each of the plurality of local maps 50 with the first subset of the plurality of anchor points 64.

In another exemplary embodiment, the first alignment algorithm is the Umeyama algorithm, also known as the Kabsch algorithm or the Kabsch-Umeyama algorithm. The Umeyama algorithm is discussed in greater detail in "Least-squares estimation of transformation parameters between two point patterns" by S. Umeyama. (IEEE Transactions on Pattern Analysis and Machine Intelligence, vol. 13, no. 4, pp. 376-380, April 1991), the entire contents of which is hereby incorporated by reference. It should be understood that the first alignment algorithm may include alternate or additional algorithms without departing from the scope of the present disclosure. After block 118, the method 100 proceeds to block 120.

At block 120, a second stage alignment of each of the plurality of local maps 50 with the global coordinate system is performed. In an exemplary embodiment, the second stage alignment is performed by the server controller 40. In another exemplary embodiment, the second stage alignment is performed by the vehicle controller 16. The following disclosure, though explained from the perspective of the server controller 40, is also applicable to embodiments where the second stage alignment is performed by the vehicle controller 16.

In general, the goal of the second stage alignment is to refine the transformations (e.g., translation, rotation, scaling, and/or the like) determined by the first stage alignment at block 118 to increase an accuracy of the fit of the plurality of local maps 50 onto the global coordinate system based on the plurality of anchor points 64. In an exemplary embodiment, the second stage alignment is performed using a second subset of the plurality of anchor points 64. The second subset of the plurality of anchor points 64 is relatively small. In a non-limiting example, the second subset of the plurality of anchor points 64 includes anchor points 64 having greater than a third predetermined quantity (e.g., twenty) of the plurality of observation points 54 located within a fourth predetermined radius (e.g., five meters) of each of the second subset of the plurality of anchor points 64. In an exemplary embodiment, the third predetermined quantity is larger than the second predetermined quantity discussed above in reference to block 118. Thus, the second subset of the plurality of anchor points 64 may be understood as having a higher "confidence" than the first subset of the plurality of anchor points 64, because the second subset of the plurality of anchor points 64 are supported by a larger quantity of observations. Furthermore, the second subset of the plurality of anchor points 64 is smaller (i.e., contains fewer anchor points 64) than the first subset of the plurality of anchor points 64.

To perform the second stage alignment, the second subset of the plurality of anchor points 64 and the plurality of local maps 50 are provided as inputs to a second alignment algorithm. In general, the second alignment algorithm is a point-cloud registration algorithm configured to determine transformations necessary to align each of the plurality of local maps 50 with the second subset of the plurality of anchor points 64. In an exemplary embodiment, the second alignment algorithm is a second machine learning alignment algorithm.

In a non-limiting example, the second machine learning alignment algorithm includes multiple layers, including an input layer and an output layer, as well as one or more hidden layers. The input layer receives the second subset of the plurality of anchor points 64 and the plurality of local maps 50 as inputs. The inputs are then passed on to the hidden layers. Each hidden layer applies a transformation (e.g., a non-linear transformation) to the data and passes the result to the next hidden layer until the final hidden layer. The output layer produces the transformations necessary to align each of the plurality of local maps 50 with the second subset of the plurality of anchor points 64.

To train the second machine learning alignment algorithm, a dataset of inputs and their corresponding optimal outputs is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the second machine learning alignment algorithm, the algorithm is capable of accurately and precisely determining the transformations necessary to align each of the plurality of local maps 50 with the second subset of the plurality of anchor points 64 based on the second subset of the plurality of anchor points 64 and the plurality of local maps 50. By adjusting the weights between the nodes in each hidden layer during training, the algorithm "learns" to recognize patterns in the data that are indicative of the transformations necessary to align each of the plurality of local maps 50 with the second subset of the plurality of anchor points 64.

In another exemplary embodiment, the second alignment algorithm is the Pose-Graph-Optimization (PGO) algorithm. The PGO algorithm is discussed in greater detail in, for example, "Globally Consistent Range Scan Alignment for Environment Mapping" by F. Lu and E. Milios. (Autonomous Robots, vol. 4, pp 333-349, October 1997), the entire contents of which is hereby incorporated by reference. It should be understood that the second alignment algorithm may include alternate or additional algorithms without departing from the scope of the present disclosure.

After performing the second stage alignment, the plurality of local maps 50 are aligned with the global coordinate system. One or more of the plurality of aligned local maps may be transmitted to the vehicle 14 using the server communication system 44. The vehicle 14 may use one or more of the plurality of aligned local maps for navigation routing, path pathing, lane identification, obstacle avoidance, and/or the like. Furthermore, the server controller 40 may use one or more of the plurality of aligned local maps to create a global map stored in the server database 42 and/or distributed to the vehicle 14 and/or the plurality of vehicles (not shown). After block 120, the method 100 proceeds to enter a standby state at block 122.

In an exemplary embodiment, the method 100 repeatedly exits the standby state 122 and is restarted at block 102. In a non-limiting example, the method 100 is restarted on a timer, for example, every three hundred milliseconds. Repeated execution of the method 100 allows for continuous update of the GNSS error and re-execution of the place recognition and re-localization algorithms to increase accuracy.

The system 10 and method 100 of the present disclosure offer several advantages. Accurate determination of GNSS error for a given location in the environment 32 allows for optimal choice of anchor point location, even when parts of the environment 32 have poor GNSS service capability. More particularly, the method 100 allows for accurate quantification of GNSS error at particular locations within the environment 32, even in absence of known reference points or ground-truth information, by leveraging SLAM-based re-localization techniques.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for aligning a plurality of local maps with a global coordinate system, the method comprising:

quantifying a global navigation satellite system (GNSS) error at each of a plurality of locations within an environment, wherein quantifying the GNSS error at each of the plurality of locations further comprises:

collecting the plurality of local maps from a plurality of vehicles, wherein collecting the plurality of local maps further comprises:

collecting the plurality of local maps from the plurality of vehicles, wherein the plurality of local maps are created using simultaneous localization and mapping (SLAM), wherein each of the plurality of local maps includes a plurality of observation points, and wherein each of the plurality of observation points includes observation data, local map coordinates, and GNSS coordinates;

identifying the plurality of locations in the plurality of local maps, wherein identifying the plurality of locations in the plurality of local maps further comprises:

identifying a plurality of proximal observation point pairs based on the plurality of observation points of each of the plurality of local maps, wherein each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps; and identifying the plurality of locations, wherein each of the plurality of locations includes the first observation point of one of the plurality of proximal observation point pairs; and quantifying the GNSS error at each of the plurality of locations based at least in part on the plurality of local maps, wherein quantifying the GNSS error at each of the plurality of locations based at least in part on the plurality of local maps further comprises:

executing a re-localization algorithm to determine a transformation vector between the first observation point and the second observation point, wherein the transformation vector describes a difference in location in the environment between the first observation point and the second observation point;

determining the GNSS error between the first observation point and the second observation point, wherein the GNSS error is:

$$e_{GNSS} = \|GNSS_1 - GNSS_2\| - \|T\|$$

wherein $e_{GNSS}$ is the GNSS error between the first observation point and the second observation point, $GNSS_1$, is the GNSS coordinates of the first observation point, $GNSS_2$, is the GNSS coordinates of the second observation point, and T is the transformation vector; and updating the GNSS coordinates of the first observation point based at least in part on the transformation vector;

determining a plurality of anchor points within the environment based at least in part on the GNSS error at each of the plurality of locations;

aligning the plurality of local maps with the global coordinate system based at least in part on the plurality of anchor points to generate a plurality of aligned local maps; and controlling a vehicle based at least in part on one or more of the plurality of aligned local maps as part of an automated driving function.

2. The method of claim 1, wherein updating the GNSS coordinates of the first observation point further comprises:

transforming GNSS coordinates of the second observation point by the transformation vector to determine transformed GNSS coordinates of the second observation point; and averaging the GNSS coordinates of the first observation point with the transformed GNSS coordinates of the second observation point to determine updated GNSS coordinates of the first observation point.

3. The method of claim 1, wherein determining the plurality of anchor points further comprises:

determining a plurality of anchor locations, wherein the plurality of anchor locations includes a subset of the plurality of locations; and determining a plurality of anchor points, wherein each of the plurality of anchor points corresponds to one of the plurality of anchor locations.

4. The method of claim 3, wherein determining the plurality of anchor locations further comprises:

determining the plurality of anchor locations, wherein each of the plurality of anchor locations has a GNSS error less than or equal to a predetermined error threshold.

5. The method of claim 4, wherein determining the plurality of anchor locations further comprises:

determining the plurality of anchor locations, wherein each of the plurality of anchor locations has a GNSS error less than or equal to a predetermined error threshold, and wherein each of the plurality of anchor locations has at least a first predetermined quantity of the plurality of observation points within a second predetermined radius of the each of the plurality of anchor locations.

6. The method of claim 1, wherein aligning the plurality of local maps with the global coordinate system further comprises:

performing a first stage alignment using a first alignment algorithm and a first subset of the plurality of anchor points; and performing a second stage alignment using a second alignment algorithm and a second subset of the plurality of anchor points, wherein the second alignment algorithm is different from the first alignment algorithm, and wherein the second subset of the plurality of anchor points contains fewer anchor points than the first subset of the plurality of anchor points.

7. A system for aligning a plurality of local maps with a global coordinate system, the system comprising:

a plurality of vehicle sensors including at least a vehicle global navigation satellite system (GNSS), a vehicle perception sensor, and a vehicle communication system; and a vehicle controller in electrical communication with the plurality of vehicle sensors, wherein the vehicle controller is programmed to:

collect the plurality of local maps of an environment, wherein the plurality of local maps are created using simultaneous localization and mapping (SLAM), wherein each of the plurality of local maps includes a plurality of observation points, and wherein each of the plurality of observation points includes observation data including observations made using the vehicle perception sensor, local map coordinates, and GNSS coordinates determined using the vehicle GNSS; and transmit the plurality of local maps to a server system using the vehicle communication system;

the server system comprising:

a server communication system; and a server controller in electrical communication with the server communication system, wherein the server controller is programmed to:

receive the plurality of local maps using the server communication system;

identify a plurality of locations in the plurality of local maps, wherein to identify the plurality of locations in the plurality of local maps, the server controller is further programmed to:

identify a plurality of proximal observation point pairs based on the plurality of observation points of each of the plurality of local maps, wherein each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps; and identify the plurality of locations, wherein each of the plurality of locations includes the first observation point of one of the plurality of proximal observation point pairs;

quantify a GNSS error at each of the plurality of locations based at least in part on the plurality of local maps, wherein to quantify the GNSS error at each of the plurality of locations, the server controller is further programmed to:

execute a re-localization algorithm to determine a transformation vector between the first observation point and the second observation point, wherein the transformation vector describes a difference in location in the environment between the first observation point and the second observation point; and determine the GNSS error between the first observation point and the second observation point, wherein the GNSS error is:

$$e_{GNSS} = \|GNSS_1 - GNSS_2\| - \|T\|$$

wherein $e_{GNSS}$ is the GNSS error between the first observation point and the second observation point, $GNSS_1$, is the GNSS coordinates of the first observation point, $GNSS_2$, is the GNSS coordinates of the second observation point, and T is the transformation vector;

determine a plurality of anchor points based at least in part on the GNSS error at each of the plurality of locations;

align the plurality of local maps with the global coordinate system based at least in part on the plurality of anchor points to generate a plurality of aligned local maps; and transmit one or more of the plurality of aligned local maps to the vehicle controller using the server communication system; and wherein the vehicle controller is further programmed to:

control the vehicle based at least in part on the one or more of the plurality of aligned local maps as part of an automated driving function.

8. The system of claim 7, wherein to determine the plurality of anchor points, the server controller is further programmed to:

determine a plurality of anchor locations, wherein the plurality of anchor locations includes a subset of the plurality of locations, wherein each of the plurality of anchor locations has a GNSS error less than or equal to a predetermined error threshold, and wherein each of the plurality of anchor locations has at least a first predetermined quantity of the plurality of observation points within a second predetermined radius of the each of the plurality of anchor locations; and determine the plurality of anchor points, wherein each of the plurality of anchor points corresponds to one of the plurality of anchor locations, and wherein GNSS coordinates of each of the plurality of anchor points are a median of the GNSS coordinates of the first observation point and the GNSS coordinates of the second observation point included in each of the plurality of anchor locations.

9. The system of claim 8, wherein to align the plurality of local maps with the global coordinate system, the server controller is further programmed to:

perform a first stage alignment using a first alignment algorithm and a first subset of the plurality of anchor points.

10. The system of claim 9, wherein to align the plurality of local maps with the global coordinate system, the server controller is further programmed to:

perform a second stage alignment using a second alignment algorithm and a second subset of the plurality of anchor points, wherein the second alignment algorithm is different from the first alignment algorithm, and wherein the second subset of the plurality of anchor points contains fewer anchor points than the first subset of the plurality of anchor points.

11. A method for aligning a plurality of local maps with a global coordinate system, the method comprising:

collecting the plurality of local maps of an environment from a plurality of vehicles, wherein the plurality of local maps are created using simultaneous localization and mapping (SLAM), wherein each of the plurality of local maps includes a plurality of observation points, and wherein each of the plurality of observation points includes observation data, local map coordinates, and GNSS coordinates;

identifying a plurality of proximal observation point pairs based on the plurality of observation points of each of the plurality of local maps, wherein each of the plurality of proximal observation point pairs includes a first observation point of the plurality of observation points and a second observation point of the plurality of observation points located within a first predetermined radius of the first observation point in the environment based at least in part on the observation data of each of the plurality of observation points of each of the plurality of local maps;

identifying a plurality of locations, wherein each of the plurality of locations includes the first observation point of one of the plurality of proximal observation point pairs;

executing a re-localization algorithm to determine a transformation vector between the first observation point and the second observation point, wherein the transformation vector describes a difference in location in the environment between the first observation point and the second observation point;

determining a GNSS error at each of the plurality of locations, wherein the GNSS error at one of the plurality of locations is:

$$e_{GNSS} = \|GNSS_1 - GNSS_2\| - \|T\|$$

wherein $e_{GNSS}$ is the GNSS error between the first observation point and the second observation point at one of the plurality of locations, $GNSS_1$ is the GNSS coordinates of the first observation point, $GNSS_2$ is the GNSS coordinates of the second observation point, and T is the transformation vector;

aligning the plurality of local maps with the global coordinate system based at least in part on the GNSS error at each of the plurality of locations to generate a plurality of aligned local maps;

transmitting one or more of the plurality of aligned local maps to a vehicle; and controlling the vehicle based at least in part on the one or more of the plurality of aligned local maps as part of an automated driving function.

12. The method of claim 11, wherein aligning the plurality of local maps with the global coordinate system furthercomprising comprises:

determining a plurality of anchor locations, wherein the plurality of anchor locations includes a subset of the plurality of locations, and wherein each of the plurality of anchor locations has a GNSS error less than or equal to a predetermined error threshold; and determining a plurality of anchor points, wherein each of the plurality of anchor points corresponds to one of the plurality of anchor locations, and wherein GNSS coordinates of each of the plurality of anchor points are a median of the GNSS coordinates of the first observation point and the GNSS coordinates of the second observation point included in each of the plurality of anchor locations.

13. The method of claim 12, wherein aligning the plurality of local maps with the global coordinate system further comprises:

performing a first stage alignment using a first alignment algorithm and a first subset of the plurality of anchor points; and performing a second stage alignment using a second alignment algorithm and a second subset of the plurality of anchor points, wherein the second alignment algorithm is different from the first alignment algorithm, and wherein the second subset of the plurality of anchor points contains fewer anchor points than the first subset of the plurality of anchor points.

* * * * *